United States Patent [19]

Taga et al.

[11] 4,333,359
[45] Jun. 8, 1982

[54] LUBRICATING OIL TRANSFER CONSTRUCTION IN AN AUTOMATIC TRANSMISSION FOR VEHICLES

[75] Inventors: Yutaka Taga; Kunio Morisawa, both of Toyota, Japan

[73] Assignee: Toyota Jidosha Kogyo Kabushiki Kaisha, Toyota, Japan

[21] Appl. No.: 143,361

[22] Filed: Apr. 24, 1980

[30] Foreign Application Priority Data

Jun. 27, 1979 [JP] Japan ............... 54-81109

[51] Int. Cl.³ ........................... F16H 57/04
[52] U.S. Cl. ............... 74/467; 184/6.12; 184/11 A
[58] Field of Search ........... 74/467; 184/6.12, 11 A, 184/11 R

[56] References Cited

U.S. PATENT DOCUMENTS

| 2,926,755 | 3/1960 | Kolbe | 184/6.12 |
| 2,968,190 | 1/1961 | Orr | 184/6.12 X |
| 2,984,122 | 5/1961 | Woolley | 74/467 |

FOREIGN PATENT DOCUMENTS 500764 3/1920 France ................ 184/6.12

*Primary Examiner*—C. J. Husar
*Assistant Examiner*—Conrad L. Berman
*Attorney, Agent, or Firm*—Stevens, Davis, Miller & Mosher

[57] ABSTRACT

An automatic transmission case is formed with a power output shaft support hole including a bearing portion and a sealing portion, and is further formed with a lubricating oil supply hole. A power output shaft formed with an axial through hole and at least one radial hole for conducting lubricating oil is assembled into the power output shaft support hole. A sleeve formed with a circumferential groove in its outside surface is fitted closely over the power output shaft from the side of the sealing portion, and a seal ring is mounted and received in the circumferential groove and in contact with the second portion so as to seal the annular space in the power output shaft support hole around the power output shaft, the sleeve including an oil communication passage extending between the lubricating oil supply hole in the case and the radial hole in the power output shaft.

4 Claims, 1 Drawing Figure

U.S. Patent     Jun. 8, 1982     4,333,359
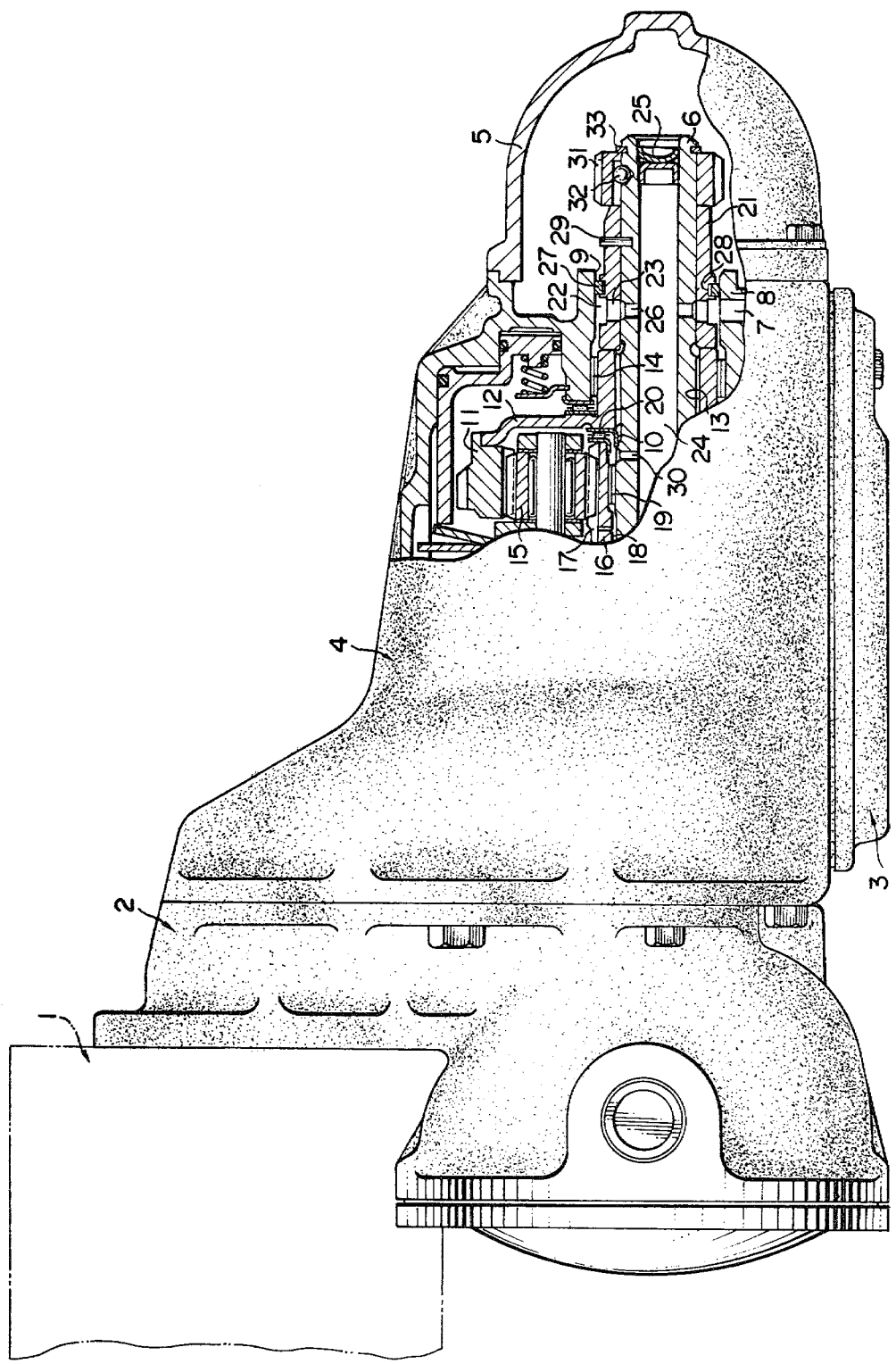

LUBRICATING OIL TRANSFER CONSTRUCTION IN AN AUTOMATIC TRANSMISSION FOR VEHICLES

BACKGROUND OF THE INVENTION

The present invention is related to the field of lubricating oil supply for automatic transmissions of automotive vehicles, and, more particularly, is related to the field of lubricating oil supply in such automatic transmissions, wherein lubricating oil is supplied to a through axial lubricating oil hole formed in a power output shaft of the transmission, and is supplied, via one or more radially extending holes in the power output shaft, to various components of the automatic transmission for lubrication purposes.

In general, in an automatic transmission, lubricating oil is provided by an oil pump driven by a rotating member of the transmission, and this lubricating oil is supplied, through a lubricating oil supply passage provided in part of the transmission case, and through a radially extending lubricating oil supply hole in the power output shaft, to an axially extending through lubricating oil hole which passes along the axis of the power output shaft. From this axial through lubricating oil hole, via one or more radially extending holes in the power output shaft, supply of lubricating oil is provided to various components, such as radial bearings, thrust bearings, planetary gear mechanisms, friction members, bushes, etc., of the automatic transmission, so as to enable their functioning to be maintained over a long period of time. This lubricating oil is usually passed through a lubricating oil cooler mounted at the front of the automotive vehicle, before it is thus supplied.

This lubricating oil supply passage in the automatic transmission case opens, generally, to an internal surface of the part of the transmission case which provides a power output shaft support opening through which the power output shaft projects. Since, inevitably, the inner radial dimension of the power output shaft support opening in the transmission case, and the outer diameter of the portion of the power output shaft which is supported thereby, will be different, thus forming a clearance, there is a possibility of leakage of lubricating oil out from the transmission case through this clearance. In other words, escape of lubricating oil presents a problem. Therefore, it is practiced to mount a lubricating oil seal ring on the output shaft, in a circumferential groove machined generally on the outer surface thereof, so as to intercept such leakage of lubricating oil.

However, the provision of this circumferential groove on the outer surface of the power output shaft reduces its effective cross section, and thereby the strength of the power output shaft is reduced.

There is also a difficulty in the assembly of such an automatic transmission, in that, if the lubricating oil seal ring is mounted directly onto the end of the power output shaft, when the power output shaft is being assembled into the transmission case, this lubricating oil seal ring must be passed through the openings in various transmission components, such as bushes and the like, which have already been assembled into the transmission case, and this runs the risk of damaging either said lubricating oil seal ring or these components themselves. It is very difficult to positively avoid collision between the lubricating oil seal ring and these components.

SUMMARY OF THE INVENTION

With the above considerations, and others, in mind, an object of the present invention is to provide a lubricating oil supply construction for an automatic transmission which will reduce leakage of lubricating oil out from the automatic transmission that may occur during the supply of lubricating oil to a through lubricating oil hole formed along the axis of a power output shaft of the transmission, through a radially extending lubricating oil supply hole provided in the power output shaft, from a lubricating oil supply passage provided in the transmission case, without weakening the power output shaft.

A further object of the present invention is to provide such a construction for an automatic transmission, which is so adapted that the transmission may be assembled easily, so that the mountability of the power output shaft to the transmission may be increased.

A yet further object of the present invention is to provide such a lubricating oil supply construction for an automatic transmission, in which the inner surface of an opening in a power output shaft supporting bush, which generally supports the power output shaft via a sleeve member mounted therearound, and the inner surface of a power output shaft support hole which confronts a lubricating oil seal ring, may be machined together at the same time to be coaxial and of the same diameter, thus facilitating accurate and cheap construction of the transmission.

According to the present invention, these and other objects are attained in an automatic transmission, comprising a power output shaft with an axial through lubricating oil hole bored along its axis and at least one radial lubricating oil hole pierced between its outside surface and said axial through hole, and a transmission case which supports said power output shaft and which is formed with a lubricating oil supply passage for providing supply of lubricating oil to said axial through lubricating oil hole in said power output shaft, by a lubricating oil transfer construction, comprising a power output shaft sleeve of a generally tubular shape, fitted closely over said power output shaft so as integrally to rotate with said power output shaft, and pierced with at least one lubricating oil communicating hole between its inside surface and its outside surface and aligned with said radial hole in said power output shaft for passing lubricating oil from said lubricating oil supply passage in said transmission case to said axial through lubricating oil hole in said power output shaft.

Other objects, features, and advantages of the present invention will become more apparent from the following detailed description of a preferred embodiment thereof.

BRIEF DESCRIPTION OF THE DRAWINGS

The present invention will become more fully understood from the following description of a preferred embodiment thereof, which is to be taken in conjunction with the accompanying drawing. It should be clearly understood, however, that the description of the embodiment, and the drawing, are provided purely for the purposes of illustration and exemplification only, and are in no way to be taken as limitative of the scope of the present invention, which, as well as the protection desired to be provided by Letters Patent, is to be defined solely by the accompanying claims. In the drawing:

FIG. 1, which is the sole FIGURE, is an external side view of an automatic transmission which may be adapted to a front engined front wheel drive vehicle or to a rear engined rear wheel drive vehicle, the parts of this automatic transmission, an understanding of whose structure is necessary for comprehension of the present invention, being shown in a partially cut away cross section.

DESCRIPTION OF THE PREFERRED EMBODIMENT

In FIG. 1, there are shown in somewhat diagrammatical form the essential components of an automatic transmission which practices a preferred embodiment of the present invention. This automatic transmission is coupled to an internal combustion engine, generally designated by 1, and comprises a torque converter case 2, which is directly attached to the internal combustion engine 1, and a transmission case 4, which is attached to the other side of the torque converter case 2, remote from the engine 1. A per se well known three element one stage type hydraulic torque converter, not shown, is provided in the upper portion of the torque converter case 2, and the power input shaft of this hydraulic torque converter is connected to the power output shaft of the internal combustion engine 1. In the lower portion of the torque converter case 2 there is provided a differential mechanism of a per se well known sort.

On the bottom part of the transmission case 4 there is mounted an oil pan 3, which covers a hydraulic fluid pressure control device of a per se well known sort which is incorporated in the lower portion of the transmission. At the right hand end in the FIGURE of the transmission case 4 there is secured an extension transmission case 5, by bolts, one of which is shown in the FIGURE.

Within the transmission case 4, in its upper left hand portion in the drawing, there is provided a drive gear, not shown in the drawing, which is connected with the power output shaft of the hydraulic torque converter. A silent chain, not shown in the drawing, transmits power from this drive gear to a driven gear, also not shown, which is provided in the lower left hand part of the transmission case 4. Further, the transmission case 4 contains two clutches, two planetary gear mechanisms, and three servo brake devices, all of a per se well known sort, and by their co-operation these various elements constitute the speed changing mechanism of the automatic transmission, and carry rotary power from the said driven gear to the power input shaft of the differential gear mechanism, providing three forward speed stages and one reverse speed stage. By this arrangement, power is transmitted from the power output shaft of the internal combustion engine 1, through, in order, the hydraulic torque converter, the drive gear, the silent chain, the driven gear, the various speed changing elements of the automatic transmission, the power output shaft 6, the drive pinion of the differential gear mechanism, the differential gear mechanism, and the power output half shafts, to the wheels of the vehicle. For a more detailed explanation of the constitution of such an automatic transmission, reference should be made to Japanese Patent Application No. 50-95888 (1975), which has been published as Japanese Patent Laying Open Publication No. 52-019860 (1977), and which is assigned to the same assignee, as is the present application.

In the following, the essential parts of this automatic transmission, involved in the present invention, and also the parts thereof, an understanding of whose arrangement is helpful for comprehension of the present invention, will be explained in detail, with reference to the sectional drawing provided in the FIGURE.

The right hand end in the drawing of the power output shaft 6 passes through the power output shaft support hole 9, which is provided in the power output shaft supporting portion 8 of the transmission case 4. This end of the power output shaft 6 is rotatably supported by the power output shaft supporting portion 8 of the transmission case 4, via a support flanged member 12 which is formed with a tubular portion, the inside of which tubular portion being provided with internal splines 13 which engage with the power output shaft external splines 10 formed on part of the circumference of the power output shaft 6 so as to prevent relative rotary motion beween these members, and a support bush 14.

The power output shaft 6 is connected to a planetary mechanism ring gear 11 via the support flanged member 12. This ring gear 11 is meshed with planetary mechanism pinion gears 15, which in turn are meshed with a planetary mechanism sun gear 17 which is formed on a planetary mechanism sun gear shaft 16. This planetary gear mechanism is of a per se well known sort. The planetary mechanism sun gear shaft 16 is formed as a hollow shaft having a central hole 18 along its axis. The power output shaft 6 passes through this sun gear shaft central hole 18, and, via a bush 19, rotatably supports the sun gear shaft 16. Further, between the right hand end face in the drawing of the sun gear shaft 16 and the lefthand end face of the support flanged member 12, there is provided a needle thrust bearing 20, which supports thrust between the power output shaft 6 and the sun gear shaft 16.

Thus, in a per se well known manner, the power output of the engine 1 is transmitted to the power output shaft 6 via the torque converter, the drive gear, the silent chain, the driven gear, and various elements of the automatic transmission, including the planetary mechanism ring gear 11 and the support flanged member 12.

On the right hand end in the drawing of the power output shaft 6, to the right of the support flanged member 12, there is fitted a power output shaft sleeve 21, which is formed in a generally tubular shape. This power output shaft sleeve 21 is located generally in the power output shaft support hole 9 of the power output shaft supporting portion 8 of the transmission case 4. The inner opening of the power output shaft sleeve 21 should be machined so as to be very close in size to the outer diameter of the power output shaft 6: typically, the clearance between these two parts should be at the most 50 microns. Further, the power output shaft sleeve 21 is integrally connected to the power output shaft 6 by a connecting pin 29, which is passed through a hole in the power output shaft sleeve 21 and into a shallow hole in the power output shaft 6. By this connecting pin 29, relative motion between the power output shaft sleeve 21 and the power output shaft 6, both along their axial direction and in their circumferential direction, is positively prevented.

On the outer surface of the power output shaft sleeve 21, at the part of it which is inside the power output shaft support hole 9, there is formed a circumferential oil conducting groove 22, which encircles the power output shaft sleeve 21. This circumferential oil conducting groove 22 is in such an axially located position on the power output shaft sleeve 21 that it opposes the lubricating oil supply passage 7, which is formed through the power output shaft supporting portion 8 of the transmission case 4 and which opens to the interior of the power output shaft support hole 9. Lubricating oil is supplied under pressure, by a lubricating oil supply means, which is not shown, but which is incorporated into the transmission, to this lubricating oil supply passage 7, and therefrom is supplied to the circumferential oil conducting groove 22. A lubricating oil communicating hole 23 is pierced from the outside of the power output shaft sleeve 21 to its inner surface, from the bottom of the circumferential oil conducting groove 22. This radially extending lubricating oil communicating hole 23 communicates directly with an opposing power output shaft radially extending hole 26, which opens from the outside of the power output shaft 6 into an axial through lubricating oil hole 24 which extends centrally along the axis of the power output shaft 6. This axial through lubricating oil hole 24 extends in the leftward direction in the drawing as far as the position where the front clutch is mounted in the transmission (not shown), and the right-hand end of the through lubricating oil hole 24 in the drawing, which opens at the end of the power output shaft 6, is closed off by a plugging means 25. The through lubricating oil hole 24 communicates with a radial lubricating oil supply aperture 30, which opens to the outer circumferential surface of the power output shaft 6, between the sun gear shaft support bush 19 and the sun gear shaft needle thrust bearing 20.

Thus, lubricating oil is supplied by the lubricating oil supply means which is not shown to the lubricating oil supply passage 7, and thence to the circumferential oil conducting groove 22, and thence to the lubricating oil communicating hole 23, thence to the power output shaft radial extending hole 26, and thence to the power output shaft axial through lubricating oil hole 24, and thence to the radial lubricating oil supply aperture 30, so as finally to lubricate the sun gear shaft support bush 19, the sun gear shaft needle thrust bearing 20, and the planetary gear mechanism as a whole. Further, of course, other similar radial lubricating oil supply apertures 30 may be provided, so as to provide lubricating oil in appropriate places to other parts of the gear box mechanism; these other lubricating oil supply apertures are not shown.

Both initially during fabrication, due to manufacturing error, and after a considerble amount of operation of the automatic transmission, due to wear, the power output shaft 6 may become out of alignment, due to inaccurate fit between the dimensions of the part of the outer surface of the support flanged member 12, which engages with the inner part of the power output shaft support bush 14, and the inner dimensions of this bush 14; due to play between the internal splines 13 of the support flanged member 12, and the external splines 10 of the power output shaft 6; and due to misalignment between the various elements of the automatic transmission. Therefore, when the power output shaft sleeve 21 is mounted over the power output shaft 6, it is desirable to have a definitely guaranteed fairly large clearance between the external surface of the power output shaft sleeve 21 and the internal surface of the power output shaft support hole 9. This clearance can advantageously be as large as 0.6 mm. To block up the gap or clearance between the outer surface of the power output shaft sleeve 21 and the inner surface of the power output shaft support hole 9, there is provided a lubricating oil seal ring 27, made of cast iron or the like, which is inserted between the power output shaft sleeve 21 and the transmission case 4. That is to say, this cast iron lubricating oil seal ring 27 is inserted into a circumferential outer groove 28 which is formed on the outer circumference of the power output shaft sleeve 21, at a position located axially between the circumferential lubricating oil conducting sleeve groove 22 and the sleeve connecting pin 29. The lubricating oil seal ring 27 fits snugly into this lubricating oil seal ring groove 28, so that their side faces engage with one another. The external circumferential surface of this lubricating oil seal ring 27 engages with the internal circumferential surface of the power output shaft support hole 9. Thus, this internal circumferential face of the power output shaft support hole 9 constitutes a lubricating oil seal ring contacting face. Thereby, lubricating oil which is being supplied to the through lubricating oil hole 24, via the lubricating oil supply passage 7, the sleeve groove 22, etc., is substantially positively prevented from leaking out from the clearance between the power output shaft sleeve 21 and the internal circumferential surface of the power output shaft support hole 9, into the extension transmission case 5.

When the automatic transmission described above is being manufactured, it is advantageous for the bush 14 to be fitted beforehand into the power output shaft supporting portion 8, and the internal surface of the bush 14 and the part of the power output shaft support hole 9 which is in contact with the cast iron lubricating oil seal ring 27 is finally machined at the same time to be coaxial and of the same diameter. This procedure simplifies the manufacturing process and increases the precision of the final product.

Against the extreme right hand end in the FIGURE of the power output shaft sleeve 21, on the power output shaft 6, there is mounted a speed indicating device drive gear 31, which, via a gear means which is not shown in the FIGURE, provides driving power for a vehicle speed indicating device such as a speedometer. This vehicle speed indicating device drive gear 31 is mounted to the power output shaft 6 via a ball key 32, and is secured so as to be restrained against axial movement by the drive gear retaining snap ring 33.

The construction described above for lubricating oil supply to the through lubricating oil hole 24, via the power output shaft sleeve 21, has the advantage that, according to the present invention, there is no need for providing any circumferential groove on the outer surface of the power output shaft 6, for mounting any lubricating oil seal ring. Thus, weakening of the power output shaft 6 due to the machining and provision of such a lubricating oil seal ring groove is eliminated. Instead, such a lubricating oil seal ring groove is provided on the outer surface of the power output shaft sleeve 21, which is not a member which is required to transmit any substantial force. Thereby, the strength of the power output shaft is improved, and any undesirable weakening thereof is eliminated.

A further advantage of the present invention is associated with the process of assembly of the automatic transmission. After mounting the power output shaft 6 into the automatic transmission case 4, it is possible to fit the power output shaft sleeve 21, with the lubricating oil seal ring 27 on it, onto the right hand end in the drawings of the power output shaft 6 from the outside, i.e. from the outside of the right hand end of the transmission. Thereby, it is prevented that this lubricating oil seal ring 27 should damage the power output shaft support bush 14, or other component parts of the automatic transmission, or should be damaged by them, which is liable to occur if it is necessary for the oil seal ring 27 to be passed all the way through the automatic transmission. Thereby, faults caused during the assembly of the automatic transmission which are liable to lead to poor operation thereof and premature failure thereof are positively eliminated.

Although the present invention has been shown and described in terms of a preferred embodiment thereof, and in language more or less specific with regard to structural features thereof, and with reference to the illustrative drawing, it should be understood that in any particular embodiment of the present invention various changes, modifications, and omissions of the form and the detail thereof can be made, by a person skilled in the art, without departing from its essential scope. Therefore, it is expressly desired that the scope of the present invention should be uniquely delimited by the legitimate and valid scope of the appended claims, which follow, and not by any of the perhaps purely fortuitous details of the shown embodiment, or of the drawing.

We claim:

1. An automatic transmission comprising:
   a power output shaft having a lubricating oil through hole bored along its axis and at least one radial lubricating oil hole extending between its outside surface and said axial through hole,
   a transmission case having a power output shaft support hole for supporting said power output shaft and a lubricating oil supply passage which opens to said power output shaft support hole to provide a supply of lubricating oil to said axial through hole in said power output shaft by way of said radial lubricating oil hole in said power output shaft, said power output shaft support hole including a first portion which serves as a radial bearing portion for rotationally supporting said power output shaft and a second portion which is located axially adjacent to and coaxial with said first portion and serves as an annular sealing surface, said power output shaft having a construction permitting its assembly into said power output shaft support hole from the side of said first portion of said support hole,
   a lubricating oil transfer mechanism comprising a power output shaft sleeve of a generally tubular shape and having a construction permitting it to be fitted closely over said power output shaft from the side of said second portion of said support hole so as to integrally rotate with said power output shaft but not to engage in any rotational power transmission, said power output shaft sleeve providing an oil communications passage between said lubricating oil supply passage in said case and said radial lubricating oil hole in said power output shaft, said power output shaft sleeve being formed with a circumferential groove in the outside surface thereof, and,
   a lubricating oil seal ring provided between said second portion of said support hole and said power output shaft sleeve and received in said circumferential groove, for intercepting leakage of lubricating oil through an annular space in the power output shaft support hole surrounding said power output shaft.

2. An automatic transmission according to claim 1 further comprising a member having a sleeve portion and mounted around said power output shaft with said sleeve portion being spline-engaged with said power output shaft, said power output shaft being rotatably supported by said first portion of said power output shaft support hole via said sleeve portion.

3. An automatic transmission according to claim 1 further comprising a bush mounted at said first portion of said power output shaft support hole, the internal surface of said bush being coaxial with and of the same diameter as said second portion of said power output shaft support hole.

4. An automatic transmission according to claim 1, wherein said oil communications passage is a circumferential lubricating oil conducting groove provided on the outer surface of said sleeve, said radial lubricating oil hole in said power shaft opening to said circumferential lubricating oil conducting groove.

* * * * *